United States Patent
Cohen

(10) Patent No.: US 10,348,193 B1
(45) Date of Patent: Jul. 9, 2019

(54) POWER SUPPLY SYSTEM WITH NON-LINEAR CAPACITANCE CHARGE-PUMP

(71) Applicant: TEXAS INSTRUMENTS INCORPORATED, Dallas, TX (US)

(72) Inventor: Isaac Cohen, Dix Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/012,292

(22) Filed: Jun. 19, 2018

(51) Int. Cl.
*H02M 3/07* (2006.01)
*G06F 1/26* (2006.01)

(52) U.S. Cl.
CPC .............. *H02M 3/07* (2013.01); *G06F 1/266* (2013.01)

(58) Field of Classification Search
CPC .................................. H02M 3/02; G06F 1/266
USPC .................................................. 327/534–536
See application file for complete search history.

(56) References Cited

U.S. PATENT DOCUMENTS

| | | | | |
|---|---|---|---|---|
| 6,710,773 B2* | 3/2004 | Jenkins | ..................... | G09G 3/30 315/169.3 |
| 8,106,901 B2* | 1/2012 | Li | ......................... | G09G 3/3696 345/211 |
| 9,621,037 B2* | 4/2017 | Rossi | ..................... | H02M 3/156 |

* cited by examiner

*Primary Examiner* — Dinh T Le
(74) *Attorney, Agent, or Firm* — Tuenlap Chan; Charles A. Brill; Frank D. Cimino

(57) ABSTRACT

One example includes a power supply system. The system includes a switch system comprising a switch that is configured to generate a switching voltage at a switching node in response to an input voltage. The system also includes a non-linear capacitance charge-pump coupled to the switching node and being configured to provide an output current in response to the switching voltage. The output current can have an amplitude that varies non-linearly with respect to an amplitude of the switching voltage. The switch system further includes an output stage configured to generate an output voltage on an output node in response to the output current.

20 Claims, 3 Drawing Sheets

US 10,348,193 B1

POWER SUPPLY SYSTEM WITH NON-LINEAR CAPACITANCE CHARGE-PUMP

TECHNICAL FIELD

This disclosure relates generally to electronic systems, and more specifically to a power supply system with a non-linear capacitance charge-pump.

BACKGROUND

Power supply circuits can be implemented in a variety of different ways. Examples of power supply circuits include synchronous rectifier power converters, asynchronous rectifier power converters, resonant power converters, and any of a variety of other types of switching power converters. Some power circuits can implement a capacitive charge pump to control the connection of a supply voltage across a load. For example, a variable switching voltage can be provided to the capacitive charge pump device to charge the capacitive charge pump device in a first switching phase, such that the capacitive charge pump device is discharged in a second switching phase to provide the charge to the load.

SUMMARY

One example includes a power supply system. The system includes a switch that is controlled via a respective switch control signal to generate a switching voltage at a switching node in response to an input voltage. The system also includes a non-linear capacitance charge-pump coupled to the switching node and being configured to provide an output current in response to the switching voltage. The output current can have an amplitude that varies non-linearly with respect to an amplitude of the switching voltage. The switch system further includes an output stage configured to generate an output voltage on an output node in response to the output current.

Another example includes a power supply system. The system includes a switch that is controlled via a respective switch control signal to generate a switching voltage at a switching node in response to an input voltage. The system also includes a non-linear capacitance charge-pump coupled to the switching node and being configured to provide an output current in response to the switching voltage. The output current can have an amplitude that varies non-linearly with respect to an amplitude of the switching voltage. The system also includes an output stage configured to generate an output voltage on an output node in response to the output current. The system further includes a switch drive stage that is configured to provide the switch control signal to the respective switch of the switch system based on the output voltage.

Another example includes a power supply system. The system includes a switch system comprising a switch that is controlled via a respective switch control signal to generate a switching voltage at a switching node in response to an input voltage. The system also includes a transistor device that exhibits a non-linear capacitance coupled to the switching node and being configured to provide an output current in response to the switching voltage. The output current can have an amplitude that varies non-linearly with respect to an amplitude of the switching voltage. The system further includes an output stage configured to generate an output voltage on an output node in response to the output current.

DETAILED DESCRIPTION

This disclosure relates generally to electronic systems, and more specifically to a power supply system with a non-linear capacitance charge-pump. The power supply system can include a switch system that includes at least one switch that is controlled via a respective at least one switch control signal. The switch system can be configured to generate a switching voltage at a switching node based on an input voltage. For example, the switch system can include at least one switch that is alternately activated and deactivated and an inductor to conduct a current from the input voltage to the switch node. The power supply system can also include a non-linear capacitance charge-pump configured to provide an output current to an output stage in response to the switching voltage. The output stage is configured to generate an output voltage in response to the output current. As an example, the power supply system can also include a switch drive stage that is configured to generate the at least one switch control signal based on the output voltage.

The output current can have an amplitude that is based on an amplitude of the switching voltage and the switching frequency of the switch(es) of the switch system. Therefore, because the switching voltage at the switch node can have an amplitude that varies greatly (e.g., by an order of magnitude or more), in a typical power supply system, the output current can have an amplitude that likewise varies greatly. While the output stage can include a regulator (e.g., a Zener diode), excessive amplitude of the output current can be sunk to a low-voltage rail (e.g., ground), which can result in inefficient waste of power. Therefore, the non-linear capacitance charge-pump is configured to provide the output current at amplitudes that vary by much smaller amplitudes in response to large changes in amplitude of the switching voltage based on having a non-linear capacitance. For example, the non-linear capacitance charge-pump can be configured as a super-junction (SJ) metal-oxide semiconductor field-effect transistor (MOSFET). Accordingly, the power supply system can be operated in a much more power efficient manner than typical power supply systems.

Figure 1:
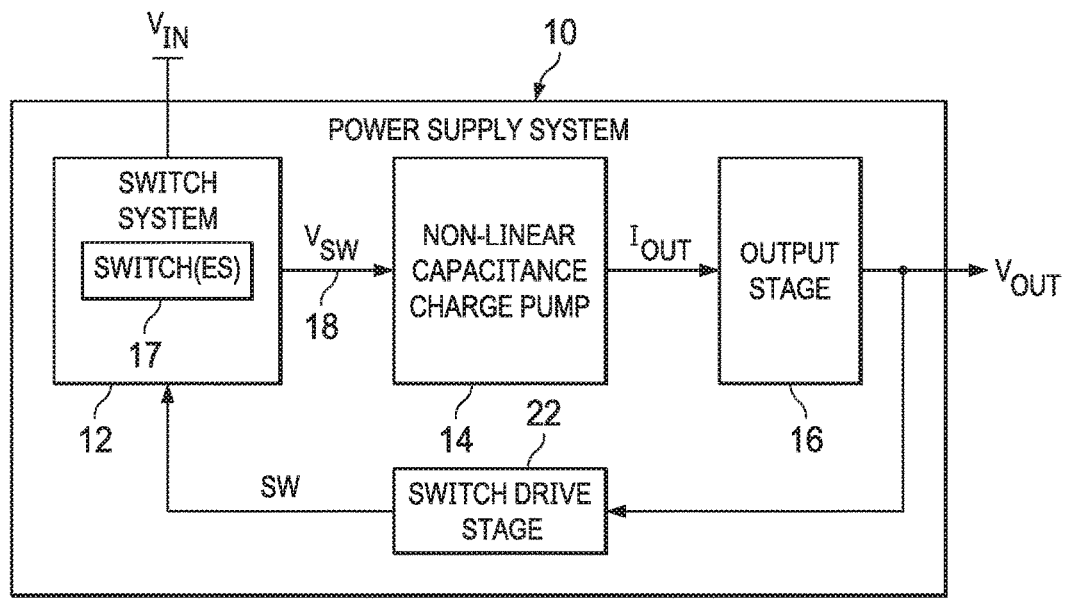
FIG. 1 illustrates an example of a power supply system.

FIG. 1 illustrates an example of a power supply system 10. The power supply system 10 can be implemented in any of a variety of power-providing applications, such as for a portable electronic device (e.g., for a universal serial bus (USB) power delivery system).

In the example of FIG. 1, the power supply system 10 includes a switch system 12, a non-linear capacitance charge-pump 14, and an output stage 16. The switch system 12 includes at least one switch 17 that is controlled via a respective at least one switch control signal, demonstrated in the example of FIG. 1 as switch control signal(s) SW. The switch system 12 can be configured to generate a switching voltage $V_{SW}$ at a switch node 18 based on an input voltage $V_{IN}$. For example, the switch system 12 can include at least one switch 17 that is alternately activated and deactivated and an inductor to conduct a current from the input voltage $V_{IN}$ to the switch node 18. As an example, the switch system 12 can be arranged as a boost switch system comprising an inductor interconnecting the input voltage $V_{IN}$ and the switch node 18, and further comprising a single switch 18 interconnecting the switch node 18 and a low-voltage rail.

The non-linear capacitance charge-pump 14 is configured to provide an output current $I_{OUT}$ to the output stage 16 in response to the switching voltage $V_{SW}$. As an example, the non-linear capacitance charge-pump 14 can exhibit a capacitance that decreases significantly at greater amplitudes of voltage across the non-linear capacitance charge-pump 14. For example, the non-linear capacitance charge-pump 14 can have a capacitance that decreases by at least one order of magnitude at a voltage amplitude greater than approximately 25 volts. As one example, the non-linear capacitance charge-pump 14 can be configured as a super-junction (SJ) metal-oxide semiconductor field-effect transistor (MOSFET). However, it is to be understood that other types of non-linear capacitance devices can be implemented instead. For example, the SJ MOSFET can be diode-connected (e.g., with a common connection between source and gate) between the switch node 18 and the output stage 16. As described in greater detail herein, the non-linear capacitance charge-pump 14 can provide the output current $I_{OUT}$ at an amplitude that can vary by much smaller changes (e.g., non-linearly) in response to large changes in amplitude of the switching voltage $V_{SW}$ based on having a non-linear capacitance.

The output stage 16 is configured to generate an output voltage $V_{OUT}$ in response to the output current $I_{OUT}$. For example, the output stage 16 can include a Zener diode to regulate the amplitude of the output voltage $V_{OUT}$. As another example, the output stage 16 can include a diode arranged in a forward bias with respect to the output current $I_{OUT}$ to provide the output current $I_{OUT}$ across an output capacitor. The output stage 16 can thus generate the output voltage $V_{OUT}$ that can be provided as a power source, such as to other electronic devices.

Additionally, the power supply system 10 further includes can also include a switch drive stage 22 that is configured to generate the switch control signal(s) SW based on the output voltage $V_{OUT}$. In the example of FIG. 1, the switch drive stage 22 receives the output voltage $V_{OUT}$ from the output stage 16 and can generate the switch control signal(s) SW to provide the alternate switching of the switch(es) of the switch system 12. As a result, the output voltage $V_{OUT}$ can operate as feedback for the switch drive stage 22, despite not necessarily sharing a common low-voltage rail (e.g., ground) connection. For example, the switch drive stage 22 can generate switch control signal(s) SW based on a pulse-width modulation (PWM) scheme based on the output voltage $V_{OUT}$.

As an example, the switching voltage $V_{SW}$ can have very large amplitude swings (e.g., one or more orders of magnitude), such as both greater than and less than zero. The output voltage $V_{OUT}$ can have an amplitude that is based on an amplitude of the switching voltage $V_{SW}$ and a switching frequency of the switch(es) of the switch system 12 in response to the switch control signal(s) SW. As a result, the non-linear capacitance charge-pump 14 can be configured to mitigate the large amplitude swings of the output current $I_{OUT}$ based on having a non-linear capacitance.

Figure 2:
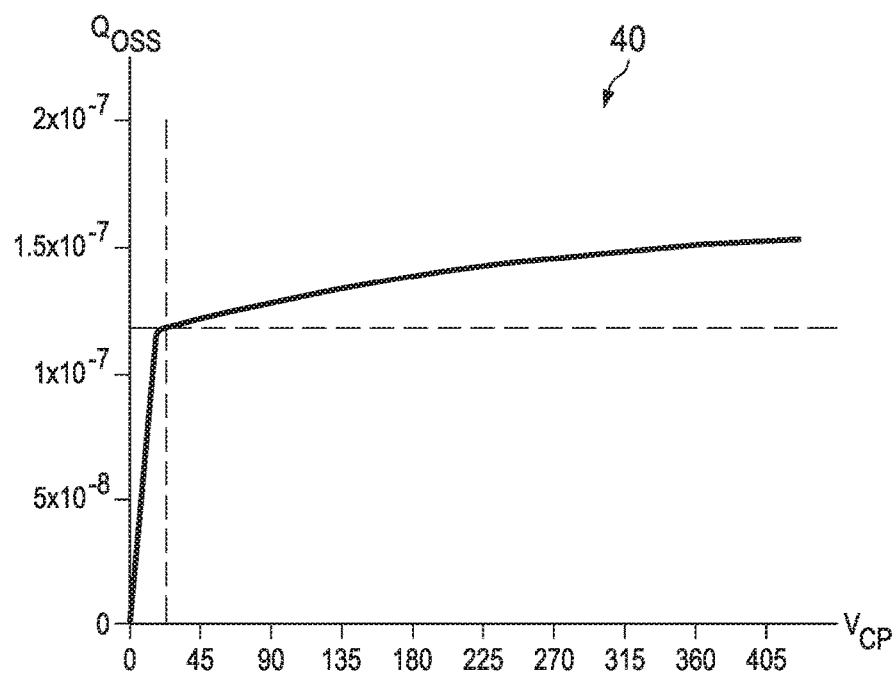
FIG. 2 illustrates a graph of output charge as a function of voltage.

For example, the non-linear capacitance charge-pump 14 can deliver pulses that are approximately the same at each period of the switching frequency to provide, as an example, an approximately 27% amplitude variation over a variation in amplitude of the switching voltage $V_{SW}$ of approximately 25 to 1. Such operation is demonstrated further in the example of FIG. 2. FIG. 2 illustrates a graph 40 of output charge $Q_{OSS}$ as a function of voltage $V_{CP}$. The voltage $V_{CP}$ corresponds to a voltage across the non-linear capacitance charge pump 14. For example, the graph 40 can correspond to characteristics of a 600 volt SJ MOSFET as part of the non-linear charge pump device 14, such that the voltage $V_{CP}$ can be a drain-source voltage of the SJ MOSFET. However, other non-linear capacitance devices can be implemented similarly herein.

In the example of FIG. 2, the graph 40 demonstrates that at amplitudes of the voltage $V_{CP}$ less than approximately 25 volts, that the output charge $Q_{OSS}$ is approximately linear with respect to the voltage $V_{CP}$. Therefore, at amplitudes of the voltage $V_{CP}$ less than the predetermined amplitude of approximately 25 volts, the non-linear charge pump device 14 exhibits a linear capacitance. In the example of FIG. 2, the graph 40 demonstrates that at an amplitude of approximately 25 volts of the voltage $V_{CP}$, the non-linear charge pump device 14 can store approximately 77% of the output charge $Q_{OSS}$. As a result, the non-linear charge pump device 14 can deliver charge linearly with respect to variations in the switching voltage $V_{SW}$ of less than approximately 25 volts.

However, the graph 40 also demonstrates that at amplitudes of the voltage $V_{CP}$ greater than the predetermined amplitude of approximately 25 volts, that the output charge $Q_{OSS}$ is non-linear with respect to the voltage $V_{CP}$. Therefore, at amplitudes of the voltage $V_{CP}$ greater than the predetermined amplitude of approximately 25 volts, the non-linear charge pump device 14 exhibits a non-linear capacitance. As a result, the non-linear charge pump device 14 can deliver less charge, and thus exhibit less voltage $V_{CP}$, in response to larger variations in the switching voltage $V_{SW}$.

Therefore, by implementing the non-linear capacitance charge-pump 14 in the power supply system 10, the power supply system 10 can substantially mitigate power losses resulting from excess amplitude of the output current $I_{OUT}$ (e.g., that is regulated via a Zener diode in the output stage, such as would be the case in the example of a typical power supply system). Additionally, the power supply system 10 can provide a more simplistic and cost-effective manner of mitigating excessive amplitude of the output current $I_{OUT}$, such as relative to power supply systems that implement programmable level-shifting charge pumps (e.g., with multiple capacitance steps). Accordingly, the power supply system 10 can be fabricated to provide a simplistic, cost-effective, and power efficient solution to providing an output voltage $V_{OUT}$ that can likewise bias the switch drive stage 22, particularly with high variation in the switching voltage $V_{SW}$.

Figure 3:
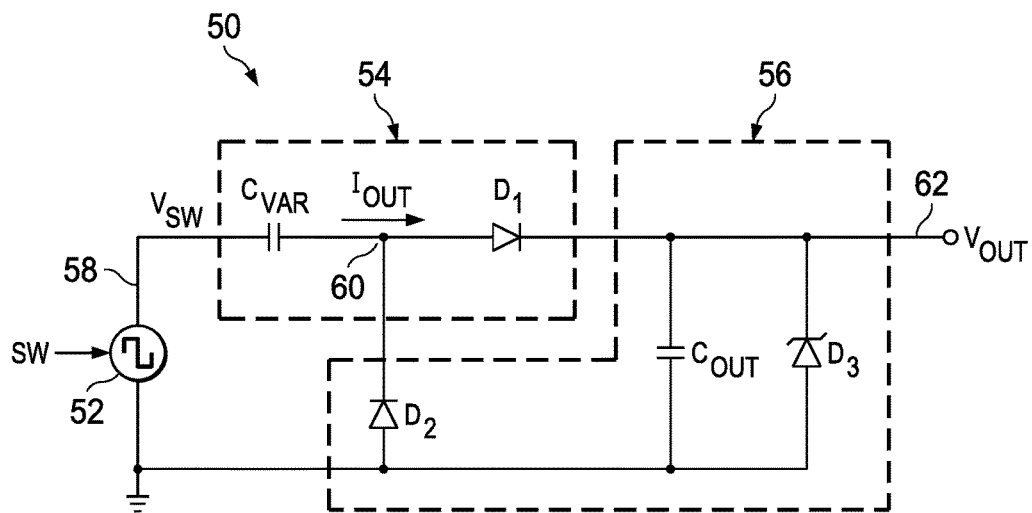
FIG. 3 illustrates another example of a power supply circuit.

FIG. 3 illustrates an example of a power supply circuit 50. The power supply circuit 50 can be implemented in any of a variety of power-providing applications, such as for a portable electronic device (e.g., for a USB power delivery system). As an example, the power supply circuit 50 may provide a structural implementation of the power supply system 10 in the example of FIG. 1.

In the example of FIG. 3, the power supply circuit 50 includes a switch system 52, a non-linear capacitance charge-pump 54, and an output stage 56. The switch system 52 is demonstrated diagrammatically in the example of FIG. 3 as a power supply that provides the switching voltage $V_{SW}$ at a switching node 58 (e.g., based on the input voltage $V_{IN}$).

For example, the switch system 52 can include at least one switch that is controlled via a respective at least one switch control signal SW. For example, the switch system 52 can include at least one switch that is alternately activated and deactivated and an inductor to conduct a current from the input voltage $V_{IN}$ to the switch node 58.

The non-linear capacitance charge-pump 54 is configured to provide an output current $I_{OUT}$ to a node 60 coupled to the output stage 56 in response to the switching voltage $V_{SW}$. In the example of FIG. 3, the non-linear capacitance charge-pump 54 is demonstrated as including a variable capacitor $C_{VAR}$ and a diode $D_1$. It is to be understood that any of a variety of different types of non-linear capacitance devices can be implemented as the variable capacitor $C_{VAR}$. Therefore, similar to as described previously in the example of FIG. 1, the non-linear capacitance charge-pump 54 can provide the output current $I_{OUT}$ at an amplitude that can vary by much smaller changes (e.g., non-linearly) in response to large changes in amplitude of the switching voltage $V_{SW}$ based on having a non-linear capacitance. In the example of FIG. 3, the diode $D_1$ interconnecting the node 60 and an output node 62, such that the diode $D_1$ provides the output current $I_{OUT}$ to the output node 62 in a forward-bias manner.

The output stage 56 is configured to generate an output voltage $V_{OUT}$ at the output node 62 in response to the output current $I_{OUT}$. The output stage 56 includes a diode $D_2$ that is arranged between the node 60 and the low-voltage rail (e.g., ground) in a reverse-bias manner. The output stage 56 further includes a Zener diode D3 that is configured to regulate the amplitude of the output voltage $V_{OUT}$ by allowing an excessive amplitude of the output current $I_{OUT}$ to flow to the low-voltage rail. In the example of FIG. 3, the output current $I_{OUT}$ is provided across an output capacitor $C_{OUT}$ to provide the output voltage $V_{OUT}$ at the output node 62. As an example, the output voltage $V_{OUT}$ can be provided as a power source, such as to other electronic devices, and can also be provided as a feedback source to an associated switch drive stage (e.g., the switch drive stage 22 in the example of FIG. 1).

Similar to as described previously, the switching voltage $V_{SW}$ can have a very large amplitude swing (e.g., one or more orders of magnitude), such as both greater than and less than zero. The output voltage $V_{OUT}$ can have an amplitude that is based on an amplitude of the switching voltage $V_{SW}$ and a switching frequency of the switch(es) of the switch system 52. Advantageously, the non-linear capacitance charge-pump 54 can be configured to mitigate the large amplitude swings of the output current $I_{OUT}$ based on having a non-linear capacitance.

For example, the output current $I_{OUT}$ is generated based on the capacitance of the non-linear capacitance charge pump 54 and the amplitude of the switching voltage $V_{SW}$, and is proportional to the switching frequency of the switch system 52. Therefore, in response to a high-dynamic range of the switching voltage $V_{SW}$, the non-linear capacitance of the non-linear capacitance charge pump 54, the output current $I_{OUT}$ can have an amplitude that exhibits a non-linear response at amplitudes of the switching voltage $V_{SW}$ that are greater than a predetermined amplitude. For example, for a linear capacitance of a typical charge pump, the output current $I_{OUT}$ would increase in amplitude linearly with the amplitude of the switching voltage $V_{SW}$, which could result in inefficient power losses (e.g., through a reverse-bias breakdown of an associated Zener diode). However, by taking advantage of a non-linear capacitance, the non-linear capacitance charge pump 54 can deliver charge that varies little in response to large variations of the switching voltage $V_{SW}$ (e.g., approximately 27% amplitude variation of the output current $I_{OUT}$ over a variation in amplitude of the switching voltage $V_{SW}$ of approximately 25 to 1). Accordingly, the power supply circuit 50 can be fabricated to provide a simplistic, cost-effective, and power efficient solution to providing an output voltage $V_{OUT}$ based on a potentially high variation in the amplitude of the switching voltage $V_{SW}$.

Figure 4:
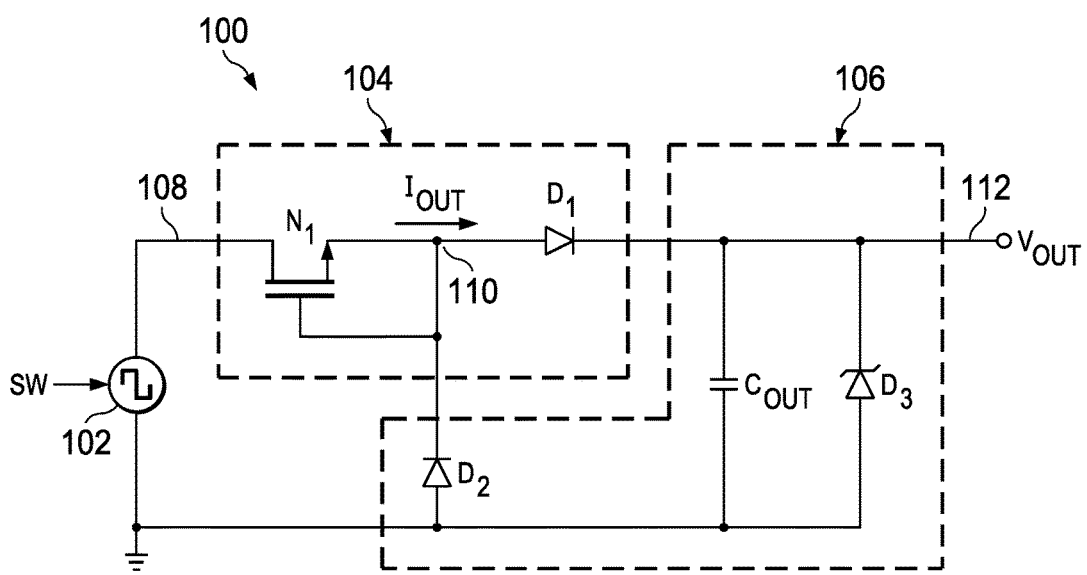
FIG. 4 illustrates another example of a power supply circuit.

FIG. 4 illustrates an example of a power supply circuit 100. The power supply circuit 100 can be implemented in any of a variety of power-providing applications, such as for a portable electronic device (e.g., for a USB power delivery system). As an example, the power supply circuit 100 can correspond to at least a portion of the power supply system 10 in the example of FIG. 1.

In the example of FIG. 4, the power supply circuit 100 includes a switch system 102, a non-linear capacitance charge-pump 104, and an output stage 106. The switch system 102 is demonstrated diagrammatically in the example of FIG. 4 as a power supply that provides the switching voltage $V_{SW}$ at a switching node 108 (e.g., based on the input voltage $V_{IN}$). For example, the switch system 102 can include at least one switch that is controlled via a respective at least one switch control signal SW. For example, the switch system 102 can include at least one switch that is alternately activated and deactivated and an inductor to conduct a current from the input voltage $V_{IN}$ to the switch node 108.

The non-linear capacitance charge-pump 104 is configured to provide an output current $I_{OUT}$ to a node 110 coupled to the output stage 106 in response to the switching voltage $V_{SW}$. In the example of FIG. 4, the non-linear capacitance charge-pump 104 is demonstrated as including an N-channel transistor device $N_1$, which can be configured as a super-junction (SJ) MOSFET, and a diode $D_1$. The N-FET $N_1$ is demonstrated in the example of FIG. 4 as being diode-connected, such that the gate and source of the N-FET $N_1$ are each coupled together at the node 110. Because an SJ MOSFET exhibits a non-linear parasitic capacitance across the drain/source connection while activated (e.g., in a linear mode or saturation mode of operation of the N-FET $N_1$), the non-linear capacitance charge-pump 104 can provide the output current $I_{OUT}$ at an amplitude that can vary by much smaller changes (e.g., non-linearly) in response to large changes in amplitude of the switching voltage $V_{SW}$ based on having a non-linear capacitance. In the example of FIG. 4, the diode $D_1$ interconnecting the node 110 and an output node 112, such that the diode $D_1$ provides the output current $I_{OUT}$ to the output node 112 in a forward-bias manner.

The output stage 106 is configured to generate an output voltage $V_{OUT}$ at an output node 112 in response to the output current $I_{OUT}$. The output stage 106 includes a diode $D_2$ that is arranged between the node 110 and the low-voltage rail (e.g., ground) in a reverse-bias manner. The output stage 106 further includes a Zener diode D3 that is configured to regulate the amplitude of the output voltage $V_{OUT}$ by allowing an excessive amplitude of the output current $I_{OUT}$ to flow to the low-voltage rail. In the example of FIG. 4, the output current $I_{OUT}$ is provided across an output capacitor $C_{OUT}$ to provide the output voltage $V_{OUT}$ at the output node 112. As an example, the output voltage $V_{OUT}$ can be provided as a power source, such as to other electronic devices, and can also be provided as a power source to an associated switch drive stage (e.g., the switch drive stage 22 in the example of FIG. 1).

Similar to as described previously, the switching voltage $V_{SW}$ can have a very large amplitude swing (e.g., one or more orders of magnitude), such as both greater than and less than zero. Because the output voltage $V_{OUT}$ can have an amplitude that is based on an amplitude of the switching voltage $V_{SW}$ and a switching frequency of the switch(es) of the switch system 102, the non-linear capacitance charge-pump 104 can be configured to mitigate the large amplitude swings of the output current $I_{OUT}$ based on having a non-linear capacitance, similar to as described previously in the example of FIG. 3. Accordingly, the power supply circuit 100 can be fabricated to provide a simplistic, cost-effective, and power efficient solution to providing an output voltage $V_{OUT}$ based on a potentially high variation in the amplitude of the switching voltage $V_{SW}$.

Figure 5:
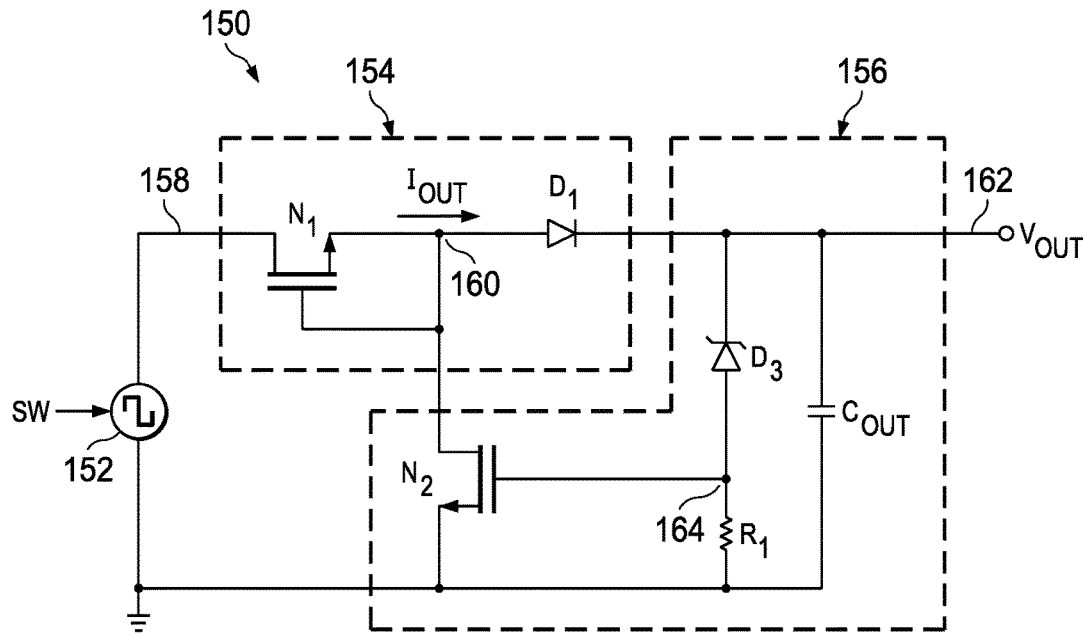
FIG. 5 illustrates another example of a power supply circuit.

FIG. 5 illustrates an example of a power supply circuit 150. The power supply circuit 150 can be implemented in any of a variety of power-providing applications, such as for a portable electronic device (e.g., for a USB power delivery system). As an example, the power supply circuit 150 can correspond to at least a portion of the power supply system 10 in the example of FIG. 1.

In the example of FIG. 5, the power supply circuit 150 includes a switch system 152, a non-linear capacitance charge-pump 154, and an output stage 156. The switch system 152 is demonstrated diagrammatically in the example of FIG. 5 as a power supply that provides the switching voltage $V_{SW}$ at a switch node 158 (e.g., based on the input voltage $V_{IN}$). For example, the switch system 152 can include at least one switch that is controlled via a respective at least one switch control signal SW. For example, the switch system 152 can include at least one switch that is alternately activated and deactivated and an inductor to conduct a current from the input voltage $V_{IN}$ to the switch node 158.

The non-linear capacitance charge-pump 154 is configured to provide an output current $I_{OUT}$ to a node 160 coupled to the output stage 156 in response to the switching voltage $V_{SW}$. In the example of FIG. 5, the non-linear capacitance charge-pump 154 is demonstrated as an N-channel transistor device $N_1$, which can be configured as a super-junction (SJ) MOSFET, and a diode $D_1$. The N-FET $N_1$ is demonstrated in the example of FIG. 5 as being diode-connected, such that the gate and source of the N-FET $N_1$ are each coupled together at the node 160. Because an SJ MOSFET exhibits a non-linear parasitic capacitance across the drain/source connection while activated (e.g., in a linear mode or saturation mode of operation of the N-FET $N_1$), the non-linear capacitance charge-pump 154 can provide the output current $I_{OUT}$ at an amplitude that can vary by much smaller changes (e.g., non-linearly) in response to large changes in amplitude of the switching voltage $V_{SW}$ based on having a non-linear capacitance. In the example of FIG. 5, the diode $D_1$ interconnecting the node 160 and an output node 162, such that the diode $D_1$ provides the output current $I_{OUT}$ to the output node 162 in a forward-bias manner.

The output stage 156 is configured to generate an output voltage $V_{OUT}$ at an output node 162 in response to the output current $I_{OUT}$. The output stage 156 includes a diode $D_2$ that is arranged between the node 160 and the low-voltage rail (e.g., ground) in a reverse-bias manner. In the example of FIG. 5, the output current $I_{OUT}$ is provided across an output capacitor $C_{OUT}$ to provide the output voltage $V_{OUT}$ at the output node 162. As an example, the output voltage $V_{OUT}$ can be provided as a power source, such as to other electronic devices, and can also be provided as a power source to an associated switch drive stage (e.g., the switch drive stage 22 in the example of FIG. 1).

The output stage 156 further includes a Zener diode $D_3$ and a resistor $R_1$ that are arranged to regulate the amplitude of the output voltage $V_{OUT}$. In the example of FIG. 5, the Zener diode $D_3$ and the resistor $R_1$ are arranged as a voltage-divider between the output node 162 and the low-voltage rail, such that a control node 164 between the Zener diode D3 and the resistor R1 controls a gate of an N-channel transistor device $N_2$ that forms part of the output stage 156. Therefore, the N-FET $N_2$ can regulate the amplitude of the output current $I_{OUT}$. For example, in response to the amplitude of the output current $I_{OUT}$ being sufficiently high to flow through the Zener diode, an activation voltage is provided at the control node 164, across the resistor R1, to activate the N-FET $N_2$. Accordingly, the N-FET $N_2$ can sink a portion of the output current $I_{OUT}$ to the low-voltage rail. While the example of FIG. 5 demonstrates that the regulator device is the N-FET $N_2$, it is to be understood that a variety of other types of regulator devices, such as including a comparator, can instead be implemented to regulate the amplitude of the output current $I_{OUT}$.

Similar to as described previously, the switching voltage $V_{SW}$ can have a very large amplitude swing (e.g., one or more orders of magnitude), such as both greater than and less than zero. Because the output voltage $V_{OUT}$ can have an amplitude that is based on an amplitude of the switching voltage $V_{SW}$ and a switching frequency of the switch(es) of the switch system 152, the non-linear capacitance charge-pump 154 can be configured to mitigate the large amplitude swings of the output current $I_{OUT}$ based on having a non-linear capacitance, similar to as described previously in the example of FIG. 3. Accordingly, the power supply circuit 150 can be fabricated to provide a simplistic, cost-effective, and power efficient solution to providing an output voltage $V_{OUT}$ based on a potentially high variation in the amplitude of the switching voltage $V_{SW}$.

Figure 6:
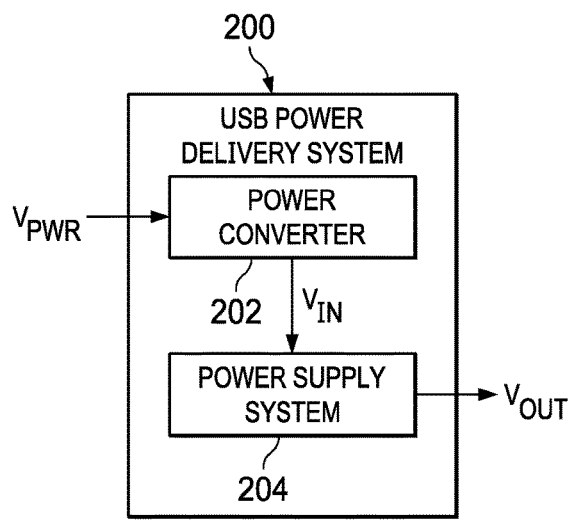
FIG. 6 illustrates an example of a universal serial bus (USB) power delivery system.

FIG. 6 illustrates an example of a USB power delivery system 200. The USB power delivery system 200 can correspond to any of a variety of USB power supplies to provide DC power to, for example, a portable electronic device. For example, the USB power delivery system 200 can be included in a USB plug-in adapter that can be configured to transmit data and power to a portable electronic device. The USB power delivery system 200 includes a power converter 202 and a power supply system 204. In the example of FIG. 6, the USB power delivery system 200 is demonstrating as receiving a power voltage $V_{PWR}$. As an example, the power converter 202 can be configured as an AC-to-DC converter, such that the power voltage $V_{PWR}$ can be an AC utility power voltage (e.g., 120 VAC/60 Hz) that can be received via a power outlet. Alternatively, the power voltage $V_{PWR}$ can be a DC voltage, such that the power converter 202 can be a step-down power converter. The power converter 202 is configured to provide a DC input voltage $V_{IN}$ to the power supply system 204.

The power supply system 204 can be configured as a DC-DC power converter configured to generate a DC output voltage $V_{OUT}$ based on the DC input voltage $V_{IN}$. For example, the power supply system 204 can correspond to the power supply system 10 in the example of FIG. 1, or any of the power supply circuits 50, 100, or 150 in the respective examples of FIGS. 2-4. Therefore, the power supply system 204 can include a non-linear charge pump that is configured to provide an output current at amplitudes that vary by much smaller amplitudes in response to large changes in amplitude of a respective switching voltage based on having a non-linear capacitance, similar to as described previously. For example, the non-linear capacitance charge-pump can be configured as an SJ MOSFET. Accordingly, the power supply system can be operated in a much more power efficient manner than typical power supply systems.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A power supply system comprising:
   a switch system comprising a switch that is controlled via a respective switch control signal to generate a switching voltage at a switching node in response to an input voltage;
   a non-linear capacitance charge-pump coupled to the switching node and configured to provide an output current in response to the switching voltage, the output current having an amplitude that varies non-linearly with respect to an amplitude of the switching voltage; and
   an output stage configured to generate an output voltage on an output node in response to the output current.

2. The system of claim 1, wherein the non-linear capacitance charge-pump comprises a transistor device configured to exhibit a non-linear capacitance across a respective drain and source, wherein the non-linear capacitance decreases by an order of magnitude in response to a voltage across the transistor device increasing to a predetermined amplitude.

3. The system of claim 2, wherein the transistor device is configured as a super-junction metal-oxide semiconductor field effect transistor (MOSFET) device.

4. The system of claim 2, wherein the output stage further comprises a regulator device configured to regulate an amplitude of the output current in response to the output current exceeding a predetermined threshold.

5. The system of claim 4, wherein the transistor device is a first transistor device, wherein the regulator device comprises a second transistor device configured to regulate the amplitude of the output current based on an amplitude of the output voltage.

6. The system of claim 5, wherein the second transistor device coupled between an output of the first transistor device and a low-voltage rail, the system further comprising:
   a Zener diode coupled between the output node and an activation terminal of the second transistor device; and
   a resistor coupled between the activation terminal and the low-voltage rail, such that the second transistor device activates in response to a predetermined amplitude of the output voltage to decrease the output current.

7. The system of claim 1, wherein the output stage comprises an output diode coupled between the charge pump and the output node through which the output current passes to provide the output voltage on the output node.

8. The system of claim 1, wherein the output stage comprises a diode comprising a cathode coupled to an output of the non-linear capacitance charge-pump and an anode coupled to a low-voltage rail.

9. The system of claim 1, further comprising a switch drive stage that is configured to provide the respective switch control signal to the switch of the switch system based on the output voltage.

10. A universal serial bus (USB) power delivery system comprising the power supply system of claim 1.

11. A power supply system comprising:
    a switch system comprising a switch that includes a control input and an output corresponding to a switching node;
    a non-linear capacitance charge-pump coupled to the switching node;
    an output stage coupled with an output of the non-linear capacitance charge-pump and having an output coupled to an output node; and
    a switch drive stage that includes an input coupled with the output of the output stage and an output coupled to the control input of the switch.

12. The system of claim 11, wherein the non-linear capacitance charge-pump comprises a transistor device that exhibits a non-linear capacitance across a respective drain and source, wherein the non-linear capacitance decreases by an order of magnitude in response to a voltage across the transistor device increasing to a predetermined amplitude.

13. The system of claim 12, wherein the transistor device comprises a super-junction metal-oxide semiconductor field effect transistor (MOSFET) device.

14. The system of claim 12, wherein the output stage further comprises a regulator device configured to regulate an amplitude of an output current in response to the output current exceeding a predetermined threshold.

15. The system of claim 14, wherein the transistor device is a first transistor device, wherein the regulator device comprises a second transistor device configured to regulate the amplitude of the output current based on an amplitude of an output voltage.

16. A power supply system comprising:
    a switch system comprising a switch that is controlled via a respective switch control signal to generate a switching voltage at a switching node in response to an input voltage;
    a transistor device that exhibits a non-linear capacitance coupled to the switching node and being configured to provide an output current in response to the switching voltage, the output current having an amplitude that varies non-linearly with respect to an amplitude of the switching voltage; and
    an output stage configured to generate an output voltage on an output node in response to the output current.

17. The system of claim 16, wherein the transistor device comprises a super-junction metal-oxide semiconductor field effect transistor (MOSFET) device.

18. The system of claim 16, wherein the output stage further comprises a regulator device configured to regulate an amplitude of the output current.

19. The system of claim 16, wherein the output stage comprises a diode comprising a cathode coupled to an output of the non-linear capacitance charge-pump and an anode coupled to a low-voltage rail.

20. The system of claim 16, further comprising a switch drive stage that is configured to provide the switch control signal to the respective switch of the switch system based on the output voltage.

* * * * *